(12) United States Patent
Fukui et al.

(10) Patent No.: US 7,525,558 B2
(45) Date of Patent: Apr. 28, 2009

(54) DISPLAY-SERVICE PROVIDING SYSTEM AND IMAGE DISPLAY APPARATUS

(75) Inventors: Yoshiki Fukui, Suwa (JP); Shinya Taniguchi, Suwa (JP); Naruhide Kitada, Fujimi-cho (JP)

(73) Assignee: Seiko Epson Corporation, Tokyo (JP)

( * ) Notice: Subject to any disclaimer, the term of this patent is extended or adjusted under 35 U.S.C. 154(b) by 192 days.

(21) Appl. No.: 11/109,647

(22) Filed: Apr. 20, 2005

(65) Prior Publication Data

US 2005/0187016 A1 Aug. 25, 2005

Related U.S. Application Data

(63) Continuation of application No. 10/245,382, filed on Sep. 18, 2002, now Pat. No. 6,940,528.

(51) Int. Cl.
 *G09G 5/00* (2006.01)
 *G06F 3/00* (2006.01)
(52) U.S. Cl. .................. 345/634; 715/751; 715/753
(58) Field of Classification Search ............... 345/1.1, 345/620, 634; 715/751, 753
 See application file for complete search history.

(56) References Cited

U.S. PATENT DOCUMENTS

| | | | |
|---|---|---|---|
| 5,204,768 A | 4/1993 | Tsakins et al. | |
| 5,738,583 A | 4/1998 | Comas et al. | |
| 5,880,732 A | 3/1999 | Tryding | |
| 5,880,745 A | 3/1999 | Miichi | |
| 6,076,167 A | 6/2000 | Borza | |
| 6,287,200 B1 | 9/2001 | Sharma | |
| 6,342,908 B1 * | 1/2002 | Bates et al. | 715/798 |
| 6,344,853 B1 | 2/2002 | Knight | |
| 6,360,101 B1 | 3/2002 | Irvin | |
| 6,520,853 B2 | 2/2003 | Suzuki | |
| 6,614,439 B2 * | 9/2003 | Matsumoto et al. | 345/530 |
| 6,625,580 B1 | 9/2003 | Tayama | |
| 6,628,297 B1 * | 9/2003 | Wraae et al. | 345/628 |
| 6,747,613 B2 * | 6/2004 | Miyawaki et al. | 345/9 |
| 6,798,429 B2 | 9/2004 | Bradski | |
| 7,006,055 B2 * | 2/2006 | Sukthankar et al. | 345/1.2 |
| 7,057,635 B1 * | 6/2006 | Naden | 348/14.02 |
| 2002/0026479 A1 | 2/2002 | Aoki et al. | |
| 2002/0058499 A1 | 5/2002 | Ortiz | |
| 2002/0072356 A1 | 6/2002 | Yamashita et al. | |

\* cited by examiner

*Primary Examiner*—M Good Johnson
(74) *Attorney, Agent, or Firm*—Oliff & Berridge, PLC

(57) ABSTRACT

A display-service providing system is provided in which an image display apparatus, such as a projector, simultaneously displays a plurality of image data on a display section and the display sizes of the image data can be controlled. A display-service providing system is formed of instructing apparatuses to provide operation instructions to a projector serving as a service providing apparatus; a virtual-object management apparatus to control operations related to virtual objects, such as setting the virtual objects and giving the instructing apparatuses a right of instructing the projector; the projector to display images corresponding to the contents of instructions sent from the instructing apparatuses, on a display section; and a network to allow data communications to be performed between the above-mentioned apparatuses.

7 Claims, 4 Drawing Sheets

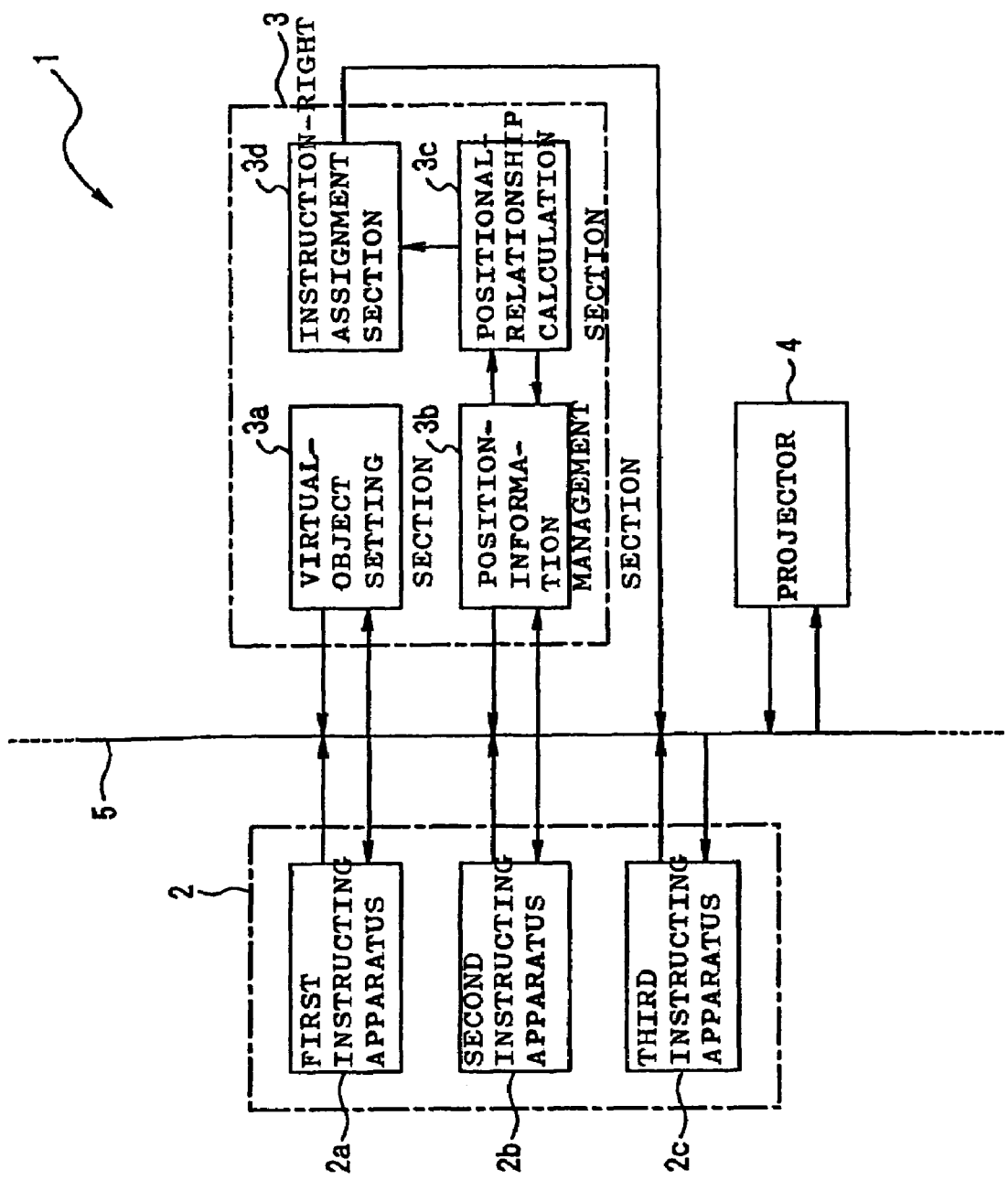
(FIG. 1)

(FIG. 2)
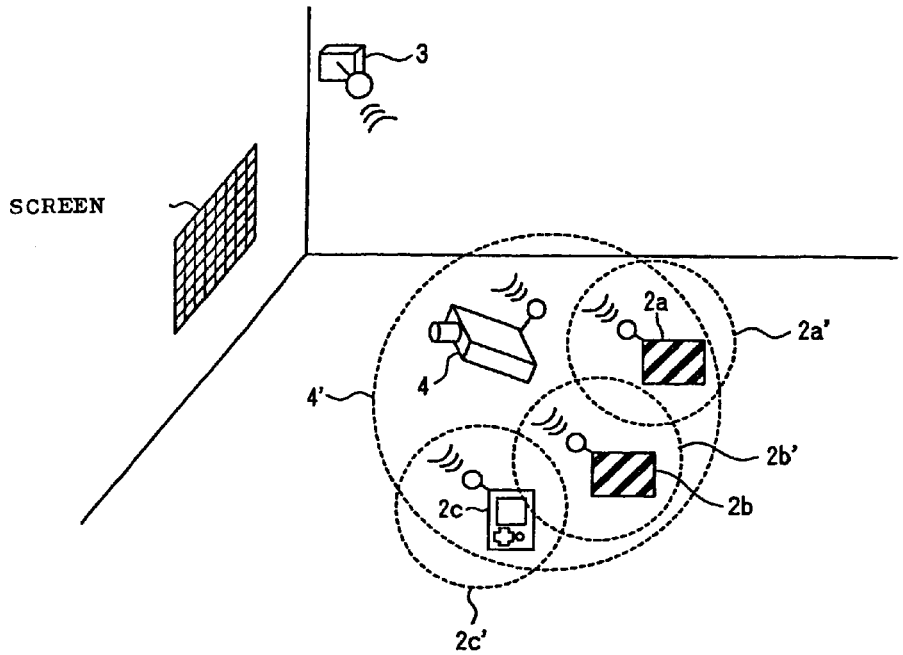
(FIG. 3)
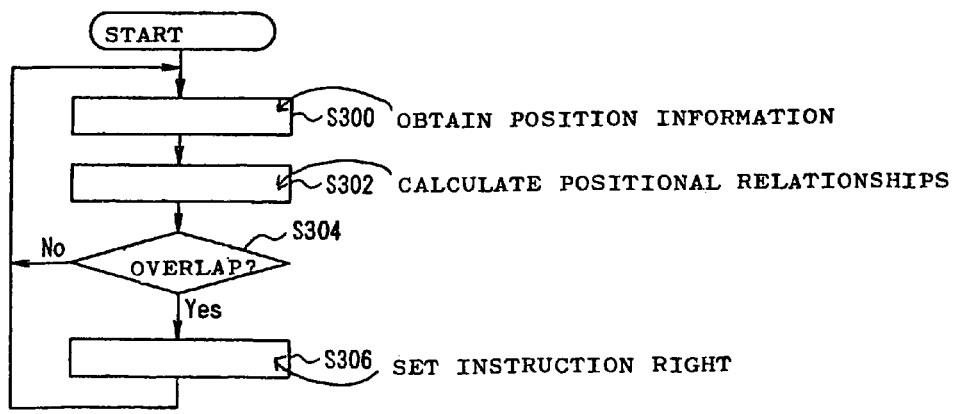

(FIG. 4)
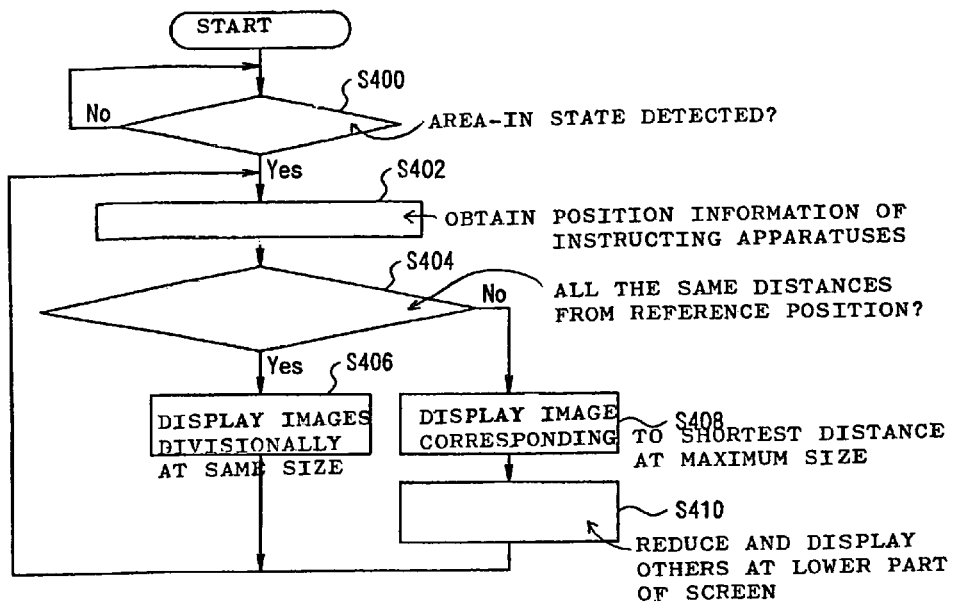
(FIG. 5)
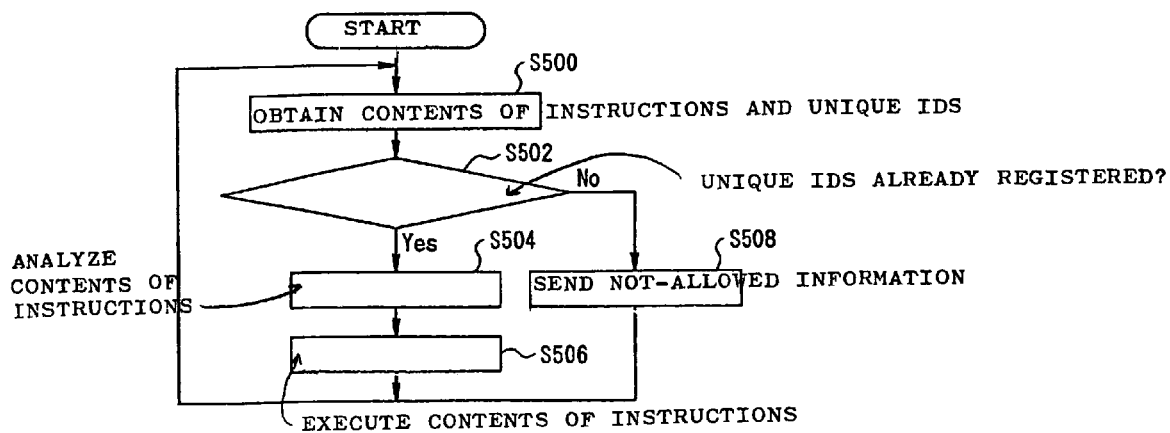

(FIG. 6)
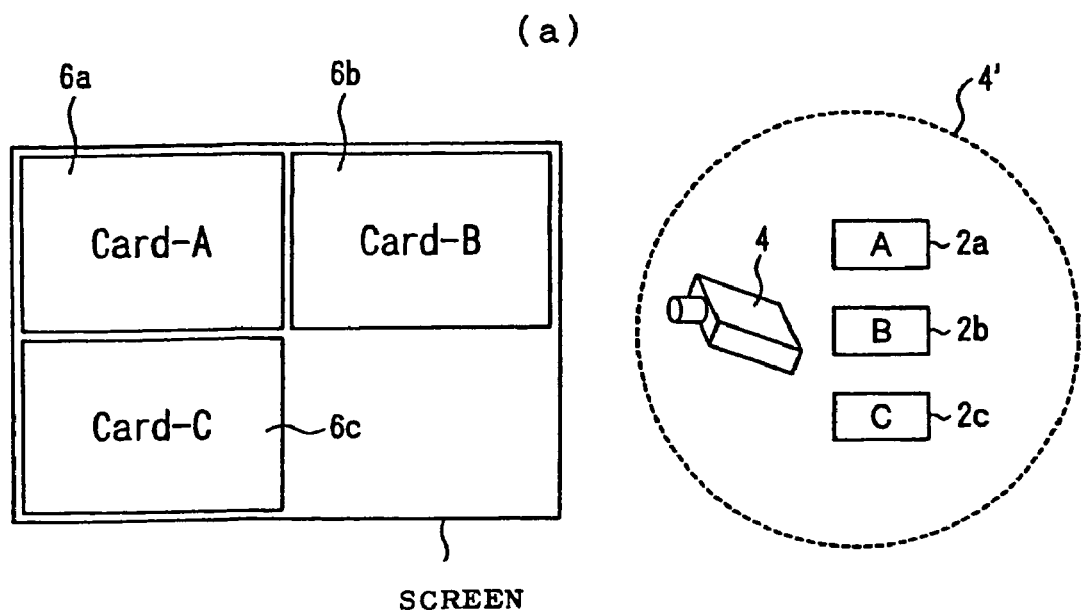
(a)
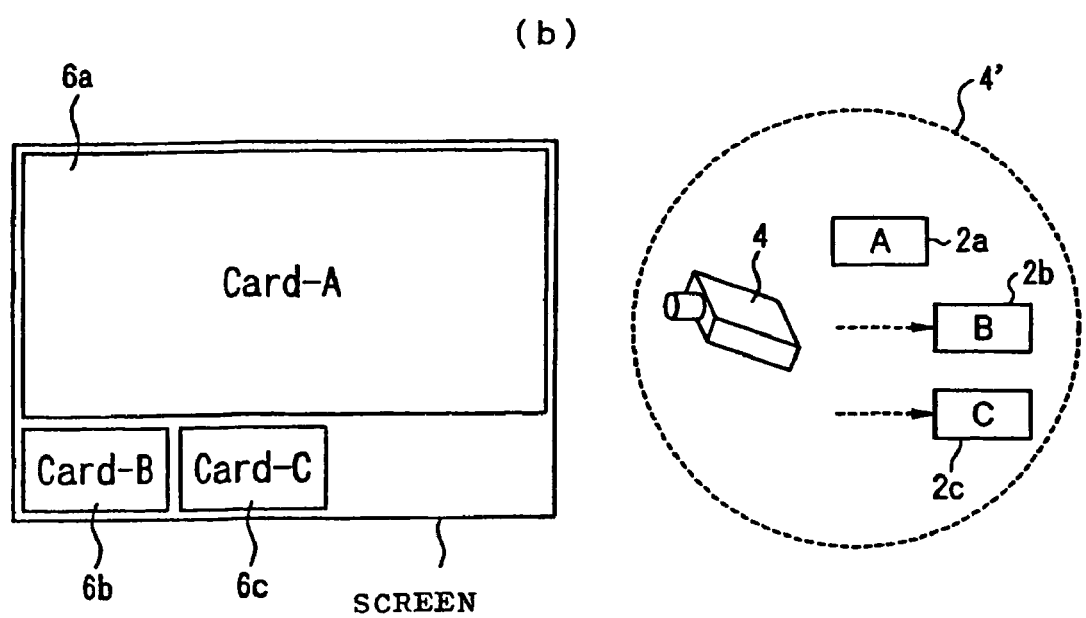
(b)

DISPLAY-SERVICE PROVIDING SYSTEM AND IMAGE DISPLAY APPARATUS

CROSS-REFERENCE TO EARLIER-FILED APPLICATION

This is a Continuation of U.S. patent application Ser. No. 10/245,382 filed Sep. 18, 2002. The entire disclosure of the prior application is hereby incorporated by reference herein in its entirety.

BACKGROUND OF THE INVENTION

1. Field of Invention

The present invention relates to image display apparatuses. More particularly, the invention relates to a display-service providing system and an image display apparatus suited to simultaneously display a plurality of image data on a display section in a division manner and to control the display sizes of the image data.

2. Description of Related Art

Projection-type display apparatuses, such as projectors, to display an image specified by a user on a screen can be used in the related art for presentations on new projects and new products in companies, or for presentations of research papers in universities and academic societies. A projector is operated by a controller, such as a personal computer or a special remote controller, to project the screen of the personal computer as is on a screen, or to display image data stored in a terminal on a network. The user uses the controller to send an instruction to the projector to perform operations, such as switching displayed images, as the presentation progresses.

To display images of a plurality of projectors, a multi-display can be used to switch to an image to be displayed on a screen for each display apparatus, at the multi-display side. Alternatively, a projector which allows a plurality of images to be displayed on a display section can be used.

SUMMARY OF THE INVENTION

In a related art method, however, images displayed divisionally on a screen have smaller display sizes as the number of displayed images increases, and it is difficult to see small-sized images in a presentation. To change the display sizes of the images, it is necessary to operate the projector. Performing this operation during a presentation is troublesome.

The present invention address the above and/or other problems in the related art. The present invention provides a display-service providing system in which an image display apparatus, such as a projector, simultaneously displays a plurality of image data on a display section and the display sizes of the image data can be controlled. The invention also provides such an image display apparatus.

To address or achieve the above, a display-service providing system of a first aspect of the invention includes an image display apparatus to display image data on the display section, a plurality of instructing apparatuses to provide instructions to the image display apparatus, a simultaneous image display device to simultaneously display image data specified by the plurality of instructing apparatuses on the display section, and a display-sized control device to automatically control the display sizes of the image data according to a predetermined condition.

With such a structure, when the image display apparatus displays a plurality of image data corresponding to the contents of instructions sent from the plurality of instructing apparatuses on the display section, it is possible that the simultaneous image display device simultaneously displays the plurality of image data divisionally on the display section and the display-size control device automatically controls the display sizes of the image data according to the predetermined condition.

Therefore, when the plurality of instructing apparatuses instructs that images should be displayed sequentially, it is possible that the simultaneous image display device simultaneously displays the images on the display section, and the display-size control device automatically controls such that, for example, an image specified by an instructing apparatus which issues an instruction first has the largest display size. The display sizes of images can be easily changed, which is useful for publicity or an explanation using images if the predetermined condition is specified appropriately.

A second aspect of the present invention is provided such that, in the display-service providing system of the first aspect, a virtual-object management terminal to manage a virtual object is provided in a communicable manner.

The virtual-object management terminal includes a virtual-object setting device to associate a first virtual object with the image display apparatus, to associate second virtual objects with the instructing apparatuses, to place the first virtual object on a virtual space associated with a real space, and to place the second virtual objects at or near the positions of the instructing apparatuses in the virtual space.

The second aspect also includes a position-information acquisition device to acquire position information used to identify the positions of the instructing apparatuses, a positional-relationship calculation device to calculate the positional relationships between the first virtual object and the second virtual objects according to the acquired position information, and an instruction-right assignment device to assign the instructing apparatuses an instruction right required to provide instructions to the image display apparatus when the calculated positional relationships indicate that the first virtual object and the second virtual objects are disposed overlappingly at the same position.

More specifically, when the instructing apparatus with which the second virtual object is associated by the virtual-object setting device approaches the first virtual object associated with the image display apparatus by the virtual-object setting device, the position-information acquisition means always obtains the position information of the instructing apparatus, the positional-relationship calculation device calculates the positional relationships between the first virtual object and the second virtual object, and, because each virtual object has a predetermined area, an instruction right required to provide instructions to the image display apparatus is assigned to the instruction apparatus when it is found from the calculation result that the areas of the virtual objects overlap.

Then, when the image display apparatus is a projector, for example, a virtual object is associated with the projector, and, as an instructing apparatus for the projector, since a PDA having a communication function, for example, can be used, a virtual object is also associated with the PDA.

When a speaker wants to use the projector, if the speaker carries the PDA, with which the virtual object has been associated, and approaches the virtual object associated with the projector, the virtual-object management terminal always obtains the position information of the PDA. Therefore, the positional relationship between the virtual objects is calculated according to the position information, and an instruction right required to provide instructions to the projector is assigned to the PDA when the virtual objects overlap.

In this case, the PDA is provided with a position-information acquisition function, such as a GPS (global positioning system), to acquire its own position information, and sends the acquired position information to the virtual-object management terminal by radio communication.

Therefore, when virtual objects are associated not only with a PDA but also with a cellular telephone, a notebook-type personal computer, and an IC card such that they can be used as instructing apparatuses, a person who wants to use the projector can use it by merely carrying the instructing apparatuses and approaching the virtual object associated with the projector.

Consequently, when the virtual object associated with the projector is disposed at a desired location, if a user carries an instructing apparatus with which a virtual object is associated and enters the place, the user can use the service, which is convenient.

A virtual object has a logical shape and a position in a virtual space associated with a real space. The shape may be, for example, a sphere having the center at the position and a radius of about 1 m, for example, or may be a cube having the center at the position and a side length of about 1 m, for example. Alternatively, the shape can be any shape, including a shape obtained by imitating a natural thing or a living thing, for example. The shape is not limited to a three-dimensional shape, and may be planar, for example.

A third aspect of the present invention is provided such that, in the display-service providing system of the first and second aspects, the predetermined condition includes the distances between a predetermined position and the instructing apparatuses, and the display-size control device automatically controls the display sizes of the image data according to the distances.

In other words, the distances between a predetermined position and the instructing apparatuses are specified as the predetermined condition, and the display-size control device automatically controls the display sizes of the image data according to the distances.

Therefore, when the predetermined position is a position where the image display apparatus is disposed, for example, if an instructing apparatus is disposed far, since the user is also positioned far, control can be made such that an image specified from the instruction apparatus is displayed large, which is convenient.

A fourth aspect of the present invention is provided such that, in the display-service providing system of the third aspect, the display-size control device makes the display size of image data displayed on the display section larger when the distances between the predetermined position and the instructing apparatuses are longer.

More specifically, when the distance between the predetermined position and an instruction apparatus is short, the display size of an image displayed on the display section is made larger than that obtained when the distance is longer. Therefore, when the predetermined position is set to a position where the image display apparatus is disposed, for example, if a plurality of system users use the service for a presentation, the display size of an image specified by an instructing apparatus carried by a system user who is close to the display apparatus is automatically made larger, which is convenient. Of course, one user can use a plurality of IC cards to display images stored in each card. Also in this case, when a card in which an image to be displayed larger is stored is made close to the image display apparatus, the image stored in the card is displayed larger.

A fifth aspect of the present invention is provided such that, in the display-service providing system of the first and second aspects, the predetermined condition is an instruction power of a system user who operates the instructing apparatuses, and the display-size control device automatically controls the display sizes of the image data according to the instruction power.

More specifically, as the predetermined condition used to control the display sizes, an instruction power of a system user who operates an instruction apparatus is specified, and the display-size control device automatically controls the display sizes of images displayed on the display section, according to the instruction power.

Therefore, when three system users, for example, A, B, and C, operate instructing apparatuses, if the maximum instruction power is assigned to A, a general instruction power is assigned to B, and a lower instruction power is assigned to C, image data specified by A, who has the maximum power, is displayed at the largest size, image data specified by B, who has the general power, is displayed at a smaller size, and image data specified by C, who has the lower power, is displayed at the smallest size. In other words, the service can be used, for example, such that when products are explained, a product of a manufacturer who pays a large sponsorship fee is displayed larger than products of other manufacturers and explained.

A sixth aspect of the present invention is provided such that, in the display-service providing systems of the first to fifth aspects, the image display apparatuses are projection-type display apparatuses.

In other words, this is a case in which the image display apparatuses of the first to fifth aspects are projection-type display apparatuses.

An image display apparatus of the seventh aspect is an image display apparatus to display an image on a display section, used in a display-service providing system in which image data corresponding to the content of an instruction sent from a system user is displayed on the display section. The image display apparatus includes a display device to simultaneously display a plurality of image data on the display section and a display-size control device to automatically control the display sizes of the image data according to a predetermined condition.

In other words, the image display apparatus of the seventh aspect is the same as the image display apparatuses in the display-service providing systems of the first to fifth aspects.

A form of the present invention of the eighth aspect is provided such that, in the image display apparatus of the seventh aspect, the image display apparatus is a projection-type display apparatus.

In other words, this is a case in which the image display apparatus of the seventh aspect is a projection-type display apparatus.

BRIEF DESCRIPTION OF THE DRAWINGS

FIG. 1 is a schematic showing the structure of a display-service providing system according to the present invention;

FIG. 2 is a schematic showing an exemplary external structure of a display-service providing system obtained when IC cards are used as first and second instructing apparatuses, a PDA is used as a third instructing apparatus, and a radio network is used as a network;

FIG. 3 is a flowchart showing processing to assign an instruction right, caused by an "area-in" state;

FIG. 4 is a flowchart showing display-size control processing;

FIG. 5 is a flowchart showing the operation processing of a projector;

FIGS. 6(a) and 6(b) are schematics showing an exemplary display-size control applied to displayed images obtained when IC cards serve as the first to third instructing apparatuses 2a to 2c, where FIG. 6(a) is a schematic showing an example in which the distances between a reference position and the instructing apparatuses are all the same, and FIG. 6(b) is a schematic showing an example in which the distances between the reference position and the instructing apparatuses are different.

DETAILED DESCRIPTION OF PREFERRED EMBODIMENTS

Exemplary embodiments of the present invention are described below by referring to the drawings. FIG. 1 to FIG. 6(b) are schematics showing a display-service providing system according to an exemplary embodiment of the present invention.

The structure of a display-service providing system according to the present invention is described first by referring to FIG. 1. FIG. 1 is a schematic showing the structure of a display-service providing system according to the present invention.

The display-service providing system 1 is formed of an instructing apparatuses 2 to provide operation instructions to a projector 4 serving as a service providing apparatus described below; a virtual-object management apparatus 3 to control operations related to a virtual object, such as setting the virtual object and giving the instructing apparatuses 2 a right of instructing the projector 4; the projector 4 to display images corresponding to the contents of instructions sent from the instructing apparatuses 2, on a display section; and a network 5 to allow data communications to be performed between the above-mentioned apparatuses.

In the present exemplary embodiment, the instructing apparatuses 2 are units which can be carried easily, such as PDAs, IC cards, notebook-type personal computers, and cellular telephones, for example, and include a first instructing apparatus 2a, a second instructing apparatus 2b, and a third instructing apparatus 2c. The instructing apparatuses 2 have position-information acquisition functions, such as a GPS, although not shown, to acquire the information of their own positions.

The virtual-object management apparatus 3 is formed of a virtual-object setting section 3a to set or delete a virtual object, such as associating virtual objects with the instructing apparatuses 2 and the projector 4, or delete an associated virtual object; a position-information management section 3b to acquire and manage the position information of the instructing apparatuses 2 with which the virtual object are associated; a positional-relationship calculation section 3c to calculate the positional relationship between the virtual objects associated with the instructing apparatuses 2 and the virtual object associated with the projector 4, from the acquired position information; and an instruction-right assignment section 3d to assign an instruction right required to provide instructions to the projector 4, to the instructing apparatuses 2 according to the calculated positional relationships.

Further, in the present exemplary embodiment, the projector 4 is a liquid-crystal projector in which an image displayed on a small liquid-crystal panel is enlarged and projected by a lens onto a large screen, and can display images and characters generated by a personal computer on the display section, such as a huge screen, as they are.

Furthermore, the projector 4 includes a simultaneous image display section to simultaneously display image data sent from a plurality of instructing apparatuses 2 on the display section in a division manner, and a display-size control section to variably control the display size of each image simultaneously displayed.

A specific operation is described below by referring to FIG. 2. FIG. 2 is a schematic of an exemplary external structure of the display-service providing system 1 obtained when IC cards are used as the first and second instructing apparatuses 2a and 2b, a PDA is used as the third instructing apparatus 2c, and a radio network is used as the network 5 (see FIG. 1).

As shown in FIG. 2, the virtual-object management apparatus 3 associates a first virtual object 4' with the projector 4, and second virtual objects 2a', 2b', and 2c' with the first to third instructing apparatuses 2a to 2c respectively.

The first virtual object and the second virtual objects are both specified as spheres having predetermined areas. In the present exemplary embodiment, it is assumed that the projector 4 cannot be moved, and therefore, the first virtual object is also handled as an object which does not change its position. Consequently, the instructing apparatus 2 with which the second virtual object is associated is carried by a user and approach the projector 4.

The position information obtained by the position-information acquisition function of the instructing apparatuses 2 is sent to the position-information management section 3b. The positional-relationship calculation section 3c calculates the positional relationships between the first virtual object 4' and the second virtual objects 2' according to the position information and the area information obtained in advance as fixed information and the area information of the virtual object 4'.

When a positional relationship (hereinafter "area-in" state) in which a part of the area of the virtual object 4' overlaps with a part of the area of the virtual object 2' is found from the calculation result, as shown in FIG. 2, the instruction-right assignment section 3d assigns the instructing apparatuses 2 an instruction right required to provide instructions to the projector 4.

In the present exemplary embodiment, the assignment of an instruction right means that an ID unique to the instructing apparatus 2 which is in the "area-in" state are registered in the projector 4. In other words, instructions sent from an instructing apparatus 2 always include the unique ID, and the projector 4 performs authentication processing to determine whether the content of a received instruction includes the unique ID. When authentication is successful, an image corresponding to the content of the instruction is displayed on the display section.

When a plurality of instructing apparatuses 2 are in the "area in" state as shown in FIG. 2, the simultaneous image display section divides the screen into a plurality of zones, and simultaneously displays a plurality of image data items. Further, in the present exemplary embodiment, automatic display-size control is performed such that the distances between the projector 4 and the instructing apparatuses 2 inside the area (hereinafter "inside the area") of the first virtual object 4' are calculated, the image data sent from the instructing apparatus 2 which has the shortest distance is displayed at the maximum size, and the remaining images are displayed at a lower part of the screen at a reduced size.

A procedure to assign an instruction right, caused by the "area-in" state is described below by referring to FIG. 3. FIG. 3 is a flowchart of processing to assign an instruction right, caused by the "area-in" state.

As shown in FIG. 3, the procedure proceeds to step S300, the position-information management section 3b acquires position information from the instructing apparatuses 2, and sends it to the positional-relationship calculation section 3c. Then, the procedure proceeds to step S302.

In step S302, the positional-relationship calculation section 3c calculates the positional relationships between the second virtual objects 2a' to 2c' associated with the first to third instructing apparatuses 2a to 2c, and the first virtual object 4' associated with the projector 4, and sends results to the instruction-right assignment section 3d. Then, the procedure proceeds to step S304.

In step S304, it is determined from the calculated positional relationships whether the areas of the second virtual objects 2a' to 2c' and the first virtual object 4' overlap. When it is determined that they overlap (yes), the procedure proceeds to step S306. When it is determined that they do not overlap (no), the procedure proceeds to step S300.

In step S306, the instruction-right assignment section 3d acquires the unique ID of the corresponding instructing apparatus 2, and further, registers the unique ID in the projector 4. Then, the procedure proceeds to step S300.

In other words, when the instructing apparatus 2 is in the "area-in" state, the unique ID of the instructing apparatus 2 is registered in the projector 4, so that the instructing apparatus 2 obtains a right to issue instructions. In the present exemplary embodiment, once an instructing apparatus 2 goes out of the area, the unique ID registered in the projector 4 is cleared. The processes of steps S300 to S306 are repeated to always manage the positional relationships.

Further, the procedure of display-size control processing performed by the display-size control section is described below by referring to FIG. 4. FIG. 4 is a flowchart of the display-size control processing.

As shown in FIG. 4, the procedure proceeds to step S400, and it is determined whether the instructing apparatus 2 is in the "area-in" state. When it is determined that the instructing apparatus 2 is in the "area-in" state (yes), the procedure proceeds to step S402. When it is determined that the instructing apparatus 2 is not in the "area-in" state (no), the procedure waits until the instructing apparatus 2 enter the "area-in" state.

In step S402, the position information of the instructing apparatus 2 with regard to the projector 4 inside the area of the projector 4 is obtained. Then, the procedure proceeds to step S404. The position of the projector 4 is set to a reference position.

In step S404, it is determined whether the position information of the instructing apparatuses 2 disposed inside the area of the reference position is position information determined to indicate all the same distance. When it is determined that the information is determined to have the same distance (yes), the procedure proceeds to step S406. When it is determined that the information is not determined to have the same distance (no), the procedure proceeds to step S408. In the present exemplary embodiment, slight differences among the distances between the reference position and the plurality of the instructing apparatuses 2 are handled as an error. When the differences among the distances between the reference position and the plurality of the instructing apparatuses 2 are within the error, it is determined that all the instructing apparatuses 2 are disposed at the same position (for example, when the differences are within 5 cm).

In step S406, since it is determined that the position information of the instructing apparatuses 2 all indicates the same distance, the corresponding images are displayed at the same display size in a division manner, and the processing is terminated.

When the procedure proceeds to step S408 because the instructing apparatuses 2 are not disposed at the same distance from the reference position (for example, when the differences are more than 5 cm), an image specified by the instructing apparatus 2 disposed closest to the reference position is displayed at a large size, and the procedure proceeds to step S410.

In step S410, images specified by instructing apparatuses 2 other than the closest instructing apparatus 2 are all reduced and displayed at a lower part of the display screen. Then, the procedure proceeds to step S402.

More specifically, in the above-described processes of steps S400 to S410, the position information of instructing apparatuses 2 which are in the "area-in" state is separately managed from that of instructing apparatuses 2 which are not in the "area-in" state. When instructing apparatuses 2 have different positional relationships with the reference position, the display-size control section displays an image specified by the instructing apparatus 2 which is closest to the reference position at a large size, and reduces and displays images specified by the other instructing apparatuses at a lower part of the screen. When instructing apparatuses 2 have the same positional relationship, the display-size control section automatically controls the display sizes so as to display images specified by the instructing apparatuses 2 at the same size.

Further, the procedure of the operation processing of the projector 4 is described below by referring to FIG. 5. FIG. 5 is a flowchart of the operation processing of the projector 4. This flowchart is executed prior to the display-size control processing described above.

As shown in FIG. 5, the procedure first proceeds to step S500, and the content of an instruction and the unique ID of an instructing apparatus 2 which is in the "area-in" state are obtained from the instructing apparatus 2. Then, the procedure proceeds to step S502.

In step S502, it is determined according to the obtained unique ID whether the corresponding instructing apparatus 2 has been registered. When it is determined that it has been registered (yes), the procedure proceeds to step S504. When it is determined that it has not been registered (no), the procedure proceeds to step S508.

In step S504, the obtained content of the instruction is analyzed. Then, the processing proceeds to step S506.

In step S506, the projector 4 is operated according to the analyzed content of the instruction. Then, the procedure proceeds to step S500. An image to be displayed reaches the screen through the processes of the simultaneous image display section and the display-size control section.

When the procedure proceeds to step S508 because the unique ID has not been registered, the instruction cannot be accepted and not-allowed information is sent to the instructing apparatus 2. Then, the procedure proceeds to step S500.

As described above, the content of an instruction sent from an instructing apparatus 2 whose unique ID has been registered is executed, whereas the content of an instruction sent from an instructing apparatus 2 whose unique ID has not been registered is not accepted.

Further, an actual operation in the present exemplary embodiment is described below by referring to FIGS. 6(a) and 6(b). FIGS. 6(a) and 6(b) are schematics showing an exemplary display-size control applied to displayed images when IC cards serve as the first to third instructing apparatuses 2a to 2c. FIG. 6(a) is a schematic showing a case in which all the instructing apparatuses 2 have the same distance from the reference position. FIG. 6(b) is a schematic showing a case in which the instructing apparatuses 2 have different distances from the reference position.

It is assumed as described above that the instructing apparatuses 2 are IC cards in which image data has been recorded, and there are three instructing apparatuses 2, the first instructing apparatus 2a, the second instructing apparatus 2b, and the third instructing apparatus 2c. The virtual-object setting section 3a of the virtual-object management apparatus 3 associates second virtual objects 2a' to 2c' with the three IC cards serving as instructing apparatuses 2. The virtual-object setting section 3a also associates a first virtual object 4' with the projector 4, which provides service. As described above, the first virtual object 4' is handled such that its position is fixed and the position information thereof is not changed.

These virtual objects are spheres having predetermined areas, and their position information and areas are managed by the position-information management section 3b. It is assumed here that the first virtual object 4', associated with the projector 4, is a sphere having a radius of 3 m, and the second virtual objects 2a' to 2c', associated with the first to third instructing apparatuses 2a to 2c, are spheres having a radius of 0.5 m.

The display-service providing system 1 provides service in which images corresponding to the contents of instructions sent from a plurality of instructing apparatuses 2 are simultaneously displayed, and the display sizes are automatically changed according to the distances between the instructing apparatuses 2 and the projector 4. It is assumed that a system user uses this service for presentations on new business and new products.

An actual operation is described below according to the above conditions. When a speaker who will make a presentation carries the first to third instructing apparatuses 2a and 2c and approaches the first virtual object 4', the position information of the IC cards is obtained by the position-information acquisition function of each IC card, and the information is transmitted to the position-information management section 3b of the virtual-object management apparatus 3 by radio communications. The position-information management section 3b obtains in real time the position information of the first to third instructing apparatuses 2a to 2c which is movable (step S300).

The obtained position information is sent to the positional-relationship calculation section 3c, and the positional relationships between the first virtual object 4' and the second virtual objects 2a' to 2c' are calculated therein (step S302). In the present exemplary embodiment, since the position-information management section 3b has the area information of the second virtual objects 2a' to 2c' associated with the first to third instructing apparatuses 2a to 2c assuming that the central position of a PDA is obtained as the position information, the positional relationships are calculated according to the area information, and the position information (this is used as a reference position) and the area information of the first virtual object 4', which is fixed.

When the positional relationships are calculated, it is determined whether the area of the first virtual object 4' and those of the second virtual objects 2a' to 2c' overlap. It is assumed here, as shown in FIGS. 6(a) and 6(b), that all of the areas overlap (step S304). This information is transmitted to the instruction-right assignment section 3d, the unique IDs of the first to third instructing apparatuses 2a to 2c are obtained therein, and registered in the projector 4 (step S306). With this, the first to third instructing apparatuses 2a to 2c can issue instructions to the projector 4.

The first to third instructing apparatuses 2a to 2c always include their unique IDs in the contents of instructions sent to the projector 4.

When the projector 4 obtains the contents of instructions (step S500), it determines whether the unique IDs included in the contents have been registered in the projector 4. In the current conditions, it is determined that the unique IDs of all of the instructing apparatuses 2 have been registered (step S502). Since the projector 4 have obtained the contents of the instructions sent from the first to third instructing apparatuses 2a to 2c having the registered unique IDs, the projector 4 analyzes the contents (step S504), and executes the operation processing according to the analyzed contents of the instructions (step S506). The contents of instructions sent from the first to third instructing apparatuses 2a to 2c include specified image data to be displayed on the screen and a switching instruction to switch to the next image. It is assumed here that an instruction of displaying image data recorded in the IC cards, which serve as the first to third instructing apparatuses 2a to 2c, is given.

Further, when the display-size control section of the projector 4 determines that the first to third instructing apparatuses 2a to 2c are in the "area-in" state (step S400), it obtains the positional relationships between the first to third instructing apparatuses 2a to 2c and the reference position, which is the position where the projector 4 is disposed, (step S402), and determines according to the positional relationships whether the first to third instructing apparatuses 2a to 2c all have distances determined to be the same from the reference position. When they all have distances determined to be the same as shown in FIG. 6(a) (step S404), first to third images 6a to 6c for which the first to third instructing apparatuses 2a to 2c, which are IC cards, issue display instructions are displayed at the same display size (step S406). In the present exemplary embodiment, when there is an instructing apparatus 2 having a unique ID not registered, neither display-size changing processing nor all display processing is applied to an image specified by the instructing apparatus 2 in registered-ID confirmation processing (included in the flowchart of the operation processing of the projector) executed before.

When it is determined that the first to third instructing apparatuses 2a to 2c have different distances from the reference position as shown in FIG. 6(b) (step S404), display-size control is performed such that the first image 6a for which the first instructing apparatus 2a which is closest to the reference position among the first to third instructing apparatuses 2a to 2c issues a display instruction is displayed at the maximum size (step S408). In the same way as described above, when the unique ID of an instructing apparatus 2 has not been registered, neither the display-size changing processing nor all of the display processing is performed.

The second image 6b and the third image 6c for which the second instructing apparatus 2b and the third instructing apparatus 2c issue display instructions are reduced in size and displayed at a lower part of the screen as shown in FIG. 6(b) (step S410).

As described above, virtual objects are associated with the instructing apparatuses 2 and the projector 4; the position information of the instructing apparatuses 2 is obtained in real time; the positional relationships of both virtual objects associated with the instructing apparatuses and the projector are calculated; and when both overlap, an instruction right to provide instructions to the projector is assigned to the instructing apparatuses 2. Therefore, by only approaching the virtual object associated with the projector 4, the owner of the instructing apparatuses 2 can use the projector 4.

Further, in the projector 4, the simultaneous image display section can simultaneously display images for which a plurality of instructing apparatuses 2 issue display instructions, on one screen in a division manner, and the display-size control section can display at the maximum size an image for which an instructing apparatus 2 which is determined to be closest to the reference position according to the positional relationships between the plurality of instructing apparatuses 2 and the reference position, which is the position where the projector 4 is disposed, issues a display instruction.

Furthermore, as a second exemplary embodiment, a case is described below in which the display-size control section automatically changes display sizes according to instruction powers assigned to instructing apparatuses 2.

It is assumed, for example, that a department-manager power is assigned to a first instructing apparatus 2a, a section-manager power is assigned to a second instructing apparatus 2b, and a general power is assigned to a third instructing apparatus 2c. In this case, the display sizes of images displayed on a screen are changed according to the powers.

In this case, it is also assumed that the instructing apparatuses are IC cards. When the first to third instructing apparatuses 2a to 2c are in the "area-in" state, the display-size control section obtains the specified instruction power from each instructing apparatus. Literally, the department-manager power is the highest power, the section-manager power is the next highest, and the general power is the lowest. Therefore, when the display-size control section obtains instruction-power information from the first to third instructing apparatuses 2a to 2c, if the first to third instructing apparatuses 2a to 2c issue display instructions of the first images 6a to 6c, the display-size control section displays the first image 6a for which the first instructing apparatus 2a, to which the department-manager power has been assigned, issues a display instruction, at the maximum size, and reduces in size and displays the remaining images at a lower part, with the display sizes being changed as shown in FIG. 6(b).

According to the second exemplary embodiment, since display sizes are changed according to powers assigned to instructing apparatuses, service dedicated to the user can be provided.

The virtual-object management apparatus 3 corresponds to the virtual-object management terminal of the second aspect, the virtual-object setting section 3a corresponds to the virtual-object setting device of the second aspect, the positional-relationship calculation section 3c corresponds to the positional-relationship calculation device of the second aspect, the instruction-right assignment section 3d corresponds to the instruction-right assignment device of the second aspect, and the projector 4 corresponds to the image display device of the first, second and seventh aspects, and also to the projection-type display apparatuses of the sixth and eighth aspects, the apparatus and the sections being shown in FIG. 1. The simultaneous image display section described in the specification corresponds to the simultaneous image display device of the first and seventh aspects, and the display-size control section described in the specification corresponds to the display-size control device of the first, third to fifth and seventh aspects.

In the above exemplary embodiments, an image for which an instructing apparatus 2 closest to the reference position issues a display instruction is displayed at the maximum size and images for which other instructing apparatuses 2 issue display instructions are reduced in size and displayed at a lower part. The present invention is not limited to this case. The present invention may be applied to a case in which display sizes corresponding to the distances between the reference position and instructing apparatuses are calculated, and images are displayed at different display sizes corresponding to the distances to the instructing apparatuses.

[Advantages]

As described above, according to a display-service providing system according to the first aspect of the present invention, when the image display apparatus displays a plurality of image data corresponding to the contents of instructions sent from the plurality of instructing apparatuses on the display section, the simultaneous image display device simultaneously displays the plurality of image data divisionally on the display section and the display-size control device automatically controls the display sizes of the image data according to a predetermined condition. Therefore, the display size of an image can be easily changed, which is useful for publicity or an explanation using an image if the predetermined condition is specified appropriately.

According to a display-service providing system according to the second aspect, in addition to the advantages obtained from the first aspect, the service can be used just by carrying an instructing apparatus with which a virtual object is associated and by approaching a virtual object associated with the image display apparatus. Consequently, when the virtual object associated with the projector is disposed at a desired place, if a user carries an instructing apparatus with which a virtual object is associated and enters the place, the user can use the service, which is convenient.

According to a display-service providing system according to the third aspect, in addition to the advantages obtained from the first and second aspects, since the distances between a predetermined position and the instructing apparatuses are specified as the predetermined condition, and the display-size control device automatically controls the display sizes of the image data on the display section according to the distances, when the predetermined position is a position where the image display apparatus is disposed, for example, if an instructing apparatus is disposed far, the user is also positioned far, then control can be made such that an image specified by the instruction apparatus is displayed large, which is convenient.

According to a display-service providing system according to the fourth aspect, in addition to the advantages obtained from the third aspect, when the distance between the predetermined position and an instruction apparatus is short, since the display size of an image displayed on the display section is made larger than that obtained when the distance is longer, when the predetermined position is set to a position where the image display apparatus is disposed, for example, if a plurality of system users use the service for a presentation, the display size of an image specified by an instructing apparatus carried by a system user who approaches the display apparatus is automatically made larger, which is convenient.

According to a display-service providing system according to the fifth aspect, since, as the predetermined condition used to control the display sizes, an instruction power of a system user who operates an instruction apparatus is specified, and the display-size control device automatically controls the display sizes of images displayed on the display section, according to the instruction power, a service made special according to powers can be provided such that when products are explained, for example, a product of a manufacturer who pays a large sponsorship fee is displayed larger than products of other manufacturers.

Since a display-service providing system according to the sixth aspect indicates a case in which the image display apparatuses of the first to fifth aspects are projection-type display apparatuses, a description of the advantages thereof are omitted.

Since an image display apparatus according to the seventh aspect is an image display apparatus having a function to simultaneously display a plurality of image data corresponding to the contents of instructions sent from a plurality of instructing apparatuses and a function to automatically control the display sizes of the image data according to a predetermined condition, the same advantages as those obtained from the first aspect are obtained.

An image display apparatus according to an eighth aspect is a projection-type display apparatus having the functions of the seventh aspect. Therefore, a description of the advantages thereof is omitted.

What is claimed is:

1. A display-service providing system to display image data corresponding to a content of an instruction sent from a system user on a display section, comprising:
    an image display apparatus to display image data on the display section;
    a plurality of instructing apparatuses to provide instructions to the image display apparatus;
    a simultaneous image display device to simultaneously display image data specified by the plurality of instructing apparatuses on the display section; and
    a display-size control device to automatically control a display size of the image data specified by one of the plurality of instructing apparatuses in relation to a display size of the image data specified by another of the plurality of instructing apparatuses according to a predetermined condition,
    wherein the predetermined condition is based on distances between a predetermined position and the instructing apparatuses.

2. The display-service providing system according to claim 1, further including:
    a virtual-object management terminal to manage a virtual object provided in a communicable manner, the virtual-object management terminal including:
    a virtual-object setting device to associate a first virtual object with the image display apparatus, to associate each one of a plurality of second virtual objects with a respective one of the plurality of instructing apparatuses, to place the first virtual object on a virtual space associated with a real space, and to manage placement of each one of the plurality of second virtual objects at or near a position of the associated respective one of the plurality of instructing apparatuses in the virtual space,
    a position-information acquisition device to acquire position information used to identify the positions of the plurality of instructing apparatuses,
    a positional-relationship calculation device to calculate the positional relationship between the first virtual object and each one of the second virtual objects according to the acquired position information, and
    an instruction-right assignment device to assign an instructing apparatus an instruction right required to provide instructions to the image display apparatus when the calculated positional relationship indicates that the first virtual object and the second virtual object associated with the instruction apparatus are disposed overlappingly at a same position.

3. The display-service providing system according to claim 1,
    the predetermined condition being an instruction power based on a hierarchy of a system user who operates an instructing apparatus, and
    the display-size control device automatically controlling the display size of the image data specified by the instructing apparatus according to the instruction power.

4. The display-service providing system according to claim 1,
    the image display apparatus being a projection-type display apparatus.

5. An image display apparatus to display an image on a display section, used in a display-service providing system in which image data corresponding to a content of an instruction sent from a system user is displayed on the display section, comprising:
    a simultaneous image display device to simultaneously display a plurality of image data on the display section; and
    a display-size control device to automatically control a display size of the image data specified by one of a plurality of instructing apparatuses in relation to a display size of the image data specified by another of the plurality of instructing apparatuses according to a predetermined condition,
    wherein the predetermined condition is based on distances between a predetermined position and the instructing apparatuses.

6. The image display apparatus according to claim 5,
    the image display apparatus being a projection-type display apparatus.

7. A system, comprising:
    a display device that displays one or more images;
    a first instructing apparatus and a second instructing apparatus that provide instructions to the display device;
    a simultaneous image display device that simultaneously displays a first image and a second image on the display device, the first image specified by the first instructing apparatus, the second image specified by the second instructing apparatus; and
    a display-size control device that automatically controls an image size of the first image relative to an image size of the second image according to a predetermined condition,
    wherein the predetermined condition is based on distances between a predetermined position and the instructing apparatuses.

* * * * *

UNITED STATES PATENT AND TRADEMARK OFFICE
CERTIFICATE OF CORRECTION

PATENT NO. : 7,525,558 B2  Page 1 of 1
APPLICATION NO. : 11/109647
DATED : April 28, 2009
INVENTOR(S) : Yoshiki Fukui, Shinya Taniguchi and Naruhide Kitada It is certified that error appears in the above-identified patent and that said Letters Patent is hereby corrected as shown below:

On the title page, item (45) please delete the following:

"(45)   Date of Patent:   Apr. 28, 2009"

and Replace with:

--(45)   Date of Patent:   *Apr. 28, 2009--

On the title page, item (*) please delete the following:

"(*)   Notice: Subject to any disclaimer, the term of this patent is extended or adjusted under 35 U.S.C. 154(b) by 192 days."

and Replace with:

--(*)   Notice: Subject to any disclaimer, the term of this patent is extended or adjusted under 35 U.S.C. 154(b) by 192 days.

This patent is subject to a terminal disclaimer.--

Signed and Sealed this

Seventh Day of July, 2009

JOHN DOLL
*Acting Director of the United States Patent and Trademark Office*